Feb. 23, 1965 A. O. BRYE 3,170,347
TRUCK WHEEL WRENCH APPARATUS
Filed Nov. 27, 1961 2 Sheets-Sheet 1

INVENTOR.
ADOLPH O. BRYE
BY
ATTORNEYS

Feb. 23, 1965   A. O. BRYE   3,170,347
TRUCK WHEEL WRENCH APPARATUS
Filed Nov. 27, 1961   2 Sheets-Sheet 2
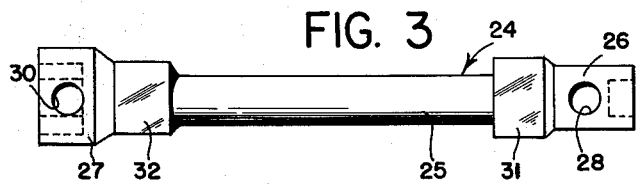
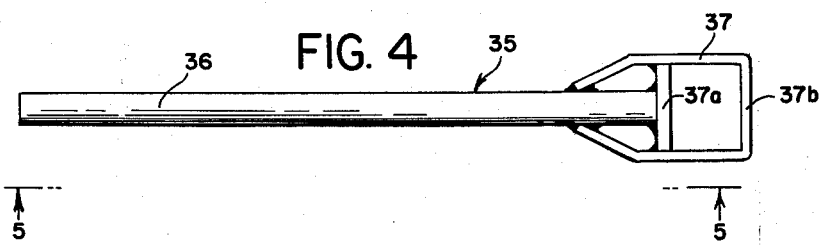
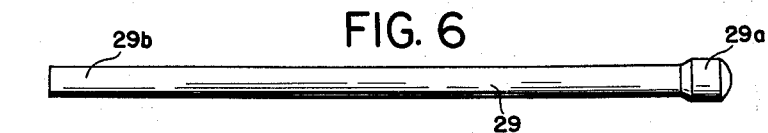
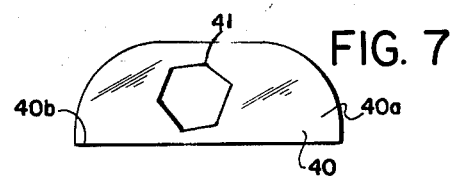
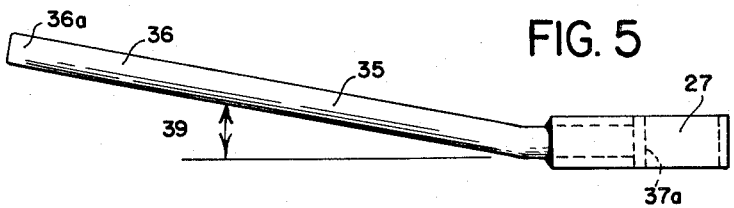
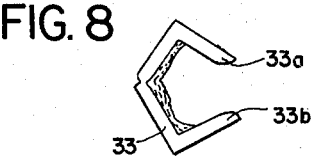
*INVENTOR.*
ADOLPH O. BRYE
BY *Dugger & Johnson*
ATTORNEYS United States Patent Office 3,170,347
Patented Feb. 23, 1965

3,170,347
TRUCK WHEEL WRENCH APPARATUS
Adolph O. Brye, Norma, N. Dak.
Filed Nov. 27, 1961, Ser. No. 154,962
3 Claims. (Cl. 81—121)

This invention relates to a new and novel truck wheel wrench. More particularly this invention relates to truck wheel wrench apparatus that permits application of greater torque for removal of nuts that retain dual and also single wheels mounted on a given hub without the use of an extra-ordinarily long lever member.

In utilizing truck wheel wrench apparatus of the prior art for removal of nuts that retain dual mounted wheels on a given hub where the nuts have been rusted or otherwise badly corroded, and it is extremely difficult to remove them, it has been a common practice to make use of a long tube that is telescopically positioned on the slide bar of the wrench being used. However, frequently in utilizing a long tube, it will bend under the strain instead of accomplishing its purpose, i.e. loosening the stuck nut. Also using such a tube is unsafe and cumbersome as it slides off the slide bar and turns without notice. In order to overcome problems of the aforementioned nature, this invention has been made.

An object of this invention is to provide new and novel truck wheel apparatus usable for removing both the outer acorn wheel nut and the inner square nut that retain dual mounted wheels on a single hub. A further object of this invention is to provide truck wheel wrench apparatus that positively prevents the outer acorn nut from rotating while a turning force is being applied to the inner square nut.

Still another object of this invention is to provide truck wheel apparatus that permits exerting increased turning force on the stuck nut without increasing the length of the lever member. Still another object of this invention is to provide new and novel truck wheel apparatus that permits exerting turning force on a nut by one lever member and alternately permits exerting a turning force by the aforementioned lever member and a lever member extending at a substantial angle to the one lever member.

Other and further objects of this invention are those herein illustrated, described and claimed, and will be apparent as the description proceeds.

To the accomplishment of the foregoing and related ends, this invention then comprises the features hereinafter fully described and particularly pointed out in the claims, the description setting forth in detail certain illustrative embodiments of the various ways in which the principles of this invention may be employed.

The invention is illustrated by reference to the drawings in which the same numerals refer to corresponding parts and in which:

FIGURE 3 is a side view of the wrench assembly of this invention;

FIGURE 4 is a plan view of the square box end wrench of this invention;

FIGURE 5 is a side view of the box end wrench of FIGURE 4, said view being generally taken along the line and in the direction of the arrows 5—5 of FIGURE 4;

FIGURE 6 is a side view of the slide bar;

FIGURE 7 is a plan view of the socket plate of this invention; and

FIGURE 8 is a front view of a metal segment for forming a collar for the wrench assembly.

Figure 1:
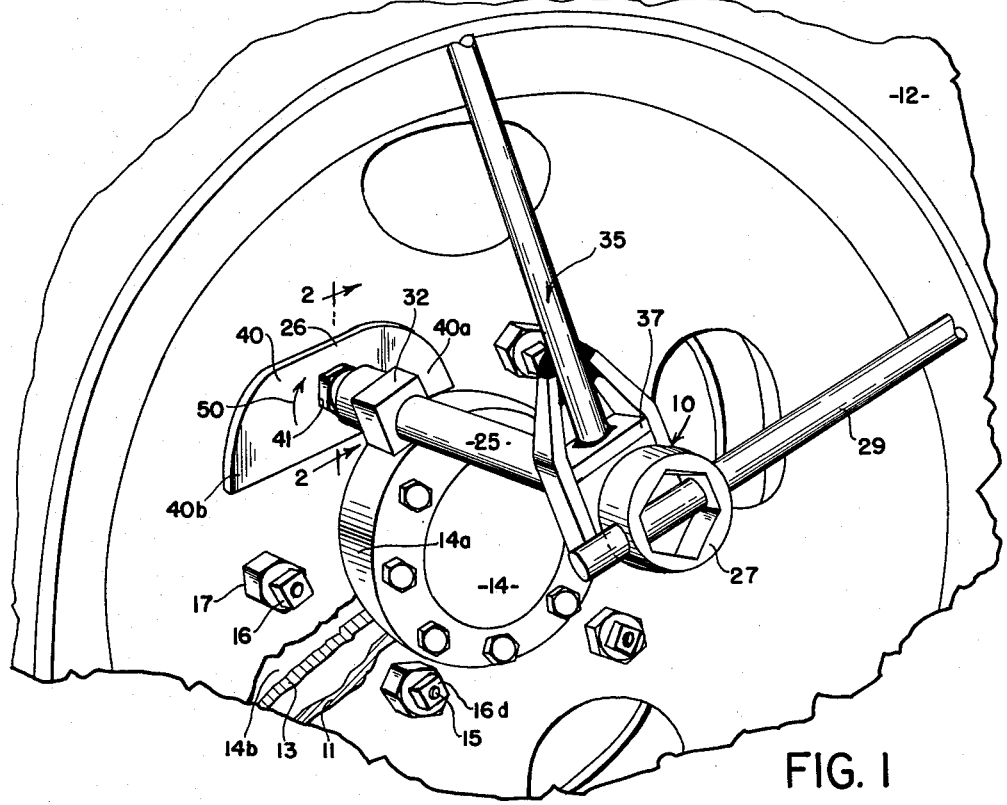
FIGURE 1 is a fragmentary perspective view of dual mounted wheels on a hub and the truck wheel wrench apparatus of this invention located in position for turning the square nut while acorn nut is being positively retained in position, portions of each of the rims being broken away.

Referring now in particular to FIGURE 1, there is illustrated the truck wheel wrench apparatus, generally designated 10 of this invention, in position for tightening the inside square nut 16 without turning the outside hexagonal acorn nut 17 during one step of the operation of removing the outside rim 11 and the inside rim 13 from the hub 14 of dual mounted wheels of the Budd wheel type. It is to be understood that there is a tire (not shown) provided upon the inside wheel rim while the tire 12 mounted on the outside wheel rim.

A plurality of axially extending studs 15 have their inner ends mounted in the hub 14 and are at the outer ends provided with external threads, said studs being mounted in angularly spaced relation about the center longitudinal axis of said hub. The inside rim 13 is provided with a plurality of apertures 18 through which the studs are extended while the outside rim 11 is provided with the same size apertures 20 through which said studs are extended. The apertures have beveled edges 18a and 20a respectively. The wheels having the same size apertures 18 and 20 are interchangeable as inner and outer wheels and also as front wheels.

The inner rim 13 is centered and held in place by the radially outwardly extending V-shaped shoulder 16a on the square nut 16 bearing against the adjacent beveled edge 18a of the aperture 18, the square nut being internally threaded at 16b for being threaded on the stud 15 to bear against the inside rim in the aforementioned manner. The square nut has an outer square head 16d onto which a socket is fitted for turning said nut.

The intermediate portion 16c of the square nut has external threads for permitting the acorn nut 17 being threaded thereon, the nut 17 having a beveled edge portion 17a that bears against the adjacent beveled edge 20a of the outside rim for centering and retaining it in abutting relationship with the adjacent outer face portion of the inside rim. As may be noted in FIGURE 2 when the nuts 16 and 17 are positioned for retaining the inside and outside rims on the hub in a position of use, the adjacent beveled edges 18a, 29a form a V-shaped notch of a slight larger size than the shoulder 16a which extends into said notch. For single front wheel installations, a heavier nut is used in place of nuts 16 and 17, said heavier nut having an outside size as nut 17 and inside size as nut 16.

For separately removing the acorn nut from the square head nuts and the square nuts from the studs on which they are threaded, there is provided the truck wrench apparatus 10. The truck wrench apparatus 10 includes a wrench assembly, generally designated 24 (see FIGURE 3), that includes an elongated shank 25 having a square nut socket 26 mounted on one end thereof and a hexagonal nut socket 27 mounted on the opposite end thereof. The square nut socket is provided with a transverse aperture 28 of a size to have the elongated slide bar 29 removably positioned therein while the hexagonal nut socket has a transverse aperture 30 of the same size for selectively having said slide bar located therein, said slide bar having an enlarged diameter portion 29a to prevent it from being pulled all the way through either of the apertures into which said bar is extended. A square collar 31 is welded (forged or casted) to the end portion of the shank adjacent the square nut socket while a second collar 32 of the same shape and size of collar 31 is welded on the opposite end portion of the shank adjacent the hexagonal nut socket.

When it is desired to remove or replace, for example the hexagonal nut, the slide bar is positioned in the aperture 28 so that the handle end 29b of the slide bar extends radially outwardly from the shank. In the event that sufficient torque cannot be obtained by physically exerting a turning force on the slide bar, there is provided the square box end wrench 35 of this invention. The square box wrench includes an elongated handle (rod) 36 having a square socket 37 welded to one end thereof, the square socket being of a size to form a close fit over either collar 31 or collar 32. The square socket may be fabricated by welding a plate 37a to one end of the rod and welding the outer end portions of the legs of the U-shaped member 37b inwardly of the plate 37a, the U-shaped member having a web portion parallel to and in spaced relation to the plate 37a. The outer end portions of the legs are bent inwardly from the plate 37a at an angle to have the ends thereof abut against the handle. As is apparent from FIGURE 3, in order to set the socket 37 over collar 31 or 32 it must be slipped over the square socket and since the hexagonal socket has a greater external dimension than the collars. The handle 36 is bent at an angle 39 to extend approximately 10° to the horizontal (see FIGURE 5) so that the outer end 29a will clear the wheel, body and/or fender when the socket 37 is located on the appropriate collar for turning the wrench assembly. It is preferred that the clearance be about 6" to 8" at the outer end of the handle.

The collars 31 and 32 may be formed from preformed metal segments 33 in the shape of an open sided pentagon, one metal segment 33 first being slipped over the socket 26 end of the wrench assembly to the position of collar 32 in FIGURE 3 and then squeezed at 33a, 33b to have about 1/16 inch gap. Segment 33 is rotated on shank 25 to a position that upon fitting the box end socket 37 over the squeeze collar, the handle 36 will extend at right angles to the slide bar in aperture 28. After properly positioning the collar on the shank it is spot welded to the shank.

In order to readily assemble the apparatus of this invention, a kit composed of two preformed metal segments and a box end 37 (with the ends of the legs not fully bent to the position of FIGURE 4) may be provided. Upon welding the metal segments to a standard issue Budd wheel wrench, as set forth above, and bending and welding the box end 37 to a length of properly bent cold roll rod, one may readily make the wrench assembly and the box end wrench of this invention. It is contemplated that a plate 40 (to be described hereinafter) may be provided in the kit.

Figure 2:
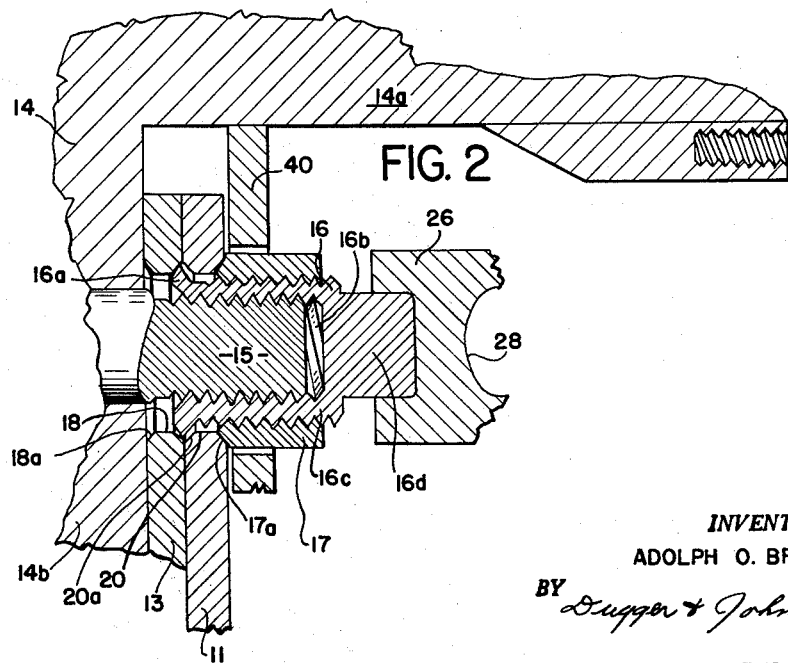
FIGURE 2 is a fragmentary cross-sectional view of rim portions of dual mounted wheels and the structure for retaining them in a mounted position, said view being generally taken along the line and looking in the direction of the arrows 2—2 of FIGURE 1.

In order to prevent the outside acorn nut from turning when the inside nut is being turned, there is provided a socket plate 40 which has a central hexagonal aperture 41 of a size to fit over the hexagonal portion of the acorn nut (see FIGURES 1 and 2). It is preferred that the bottom edge of the aperture 41 be inclined relative to the horizontal at an angle which is about 10°. As a result if the plate does not fit over the acorn nut on the first try (as set forth below), the plate may be turned back to front. The plate is elongated so that inner end portion 40a or end portion 40b will bear against the reduced diameter portion 14a of the hub upon the acorn nut being rotated sufficiently in the proper direction. Rotation of the hexagonal nut in the direction of arrow 50 to rotate the socket plate to have, for example, end portion 40a, as illustrated, bear against the reduced diameter portion of the hub which will preclude the acorn nut being further rotated in said direction even though it is stuck on the inside square nut; and upon sufficient force being applied to the square nut, it will be rotated relative to hexagonal nut. As a result, the acorn nut is broken loose from the inside nut.

In removing the two wheels from the hub 14, first the hexagonal socket 27 is positioned over the acorn nut 17 and the slide bar 29 extended through the aperture 28 at 180° to that illustrated in FIGURE 1. Thereupon, the user applies a turning force to the outer end of the slide bar to rotate the wrench assembly in the direction opposite arrow 50 for loosening the hexagonal nut. If sufficient turning force cannot be manually applied through the slide bar to the wrench assembly for loosening the acorn nut, then the wrench assembly is removed from the nut 17 and the socket 37 of the square box end wrench 35 is positioned over the collar 31. Now the hexagonal socket is again positioned over the acorn nut. With the wrench apparatus including the wrench assembly, the slide bar, and the box end wrench positioned so that the slide bar extends nearly horizontally, and the handle of the square box wrench extends generally upwardly, the user now positions his foot on the outer end of the slide bar 29 and at the same time grips the outer end of the handle 36 to simultaneously apply turning force to both the slide bar and the square box end wrench. As a result, substantially greater torque may be exerted upon the wrench assembly to thereby loosen the hexagonal or acorn nut without having to find and position a long tubular member over the outer end of the slide bar to thereby increase the effective length of the slide bar. That is by using original slide bar 29 only, a great deal of pressure exerted at point 29b is lost at wrench 24 because of tendency of detrimental downward and misalignment movement at this end. Whereas by exerting pull on vertical wrench 35 and stepping on slide bar 29 (effort applied at 2 separate points) this tendency is overcome thereby putting all one's effort to effective work. This same principle makes it possible for one to safely lunge on the wrench of this invention in stubborn cases.

In the event that upon trying to loosen the acorn nut, both the acorn nut and the square nut 16 simultaneously turn on the stud 15, both nuts are turned (opposite arrow 50) one or two turns. Now the wrench assembly can be removed and the socket plate is positioned so that the acorn nut extends through the aperture 41. At this time the square socket 26 is set over the head end 16d of the square nut and the wrench assembly is used with slide bar 29 by itself (as shown in FIGURE 1) or in combination with the square box end wrench to turn the square nut in the direction of arrow 50. This results in both the acorn nut and the square nut rotating until the end diameter portion 40a has been rotated sufficiently to bear against the reduced diameter portion of the hub. At this time further turning of the square nut takes place without any rotational movement of the acorn nut. The square nut is continually rotated until it is as tight as possible. This operation unlocks the two wheel nuts 16 and 17 thereby making it possible to remove the acorn nut in the usual manner. In the event that by again positioning the socket 27 on the acorn nut and turning it in the direction opposite arrow 50, both nuts rotate in said direction, the aforementioned procedure of first loosening both nuts a couple of turns and then use the socket plate and tightening (direction of arrow 50) the square nut is repeated until the acorn nut is completely broken loose from the square nut. The above procedure is repeated until all the acorn nuts are removed. Thereupon the rim 11 of the outside wheel may be removed. Now all that is necessary to do is to loosen the square nuts and thereupon the inside rim may be removed.

It is to be mentioned that in the event that the acorn nut of FIGURE 1 is, for example, a left hand nut, then upon using a socket plate in the aforementioned manner on the right hand nut, the end portion 40b would bear against the hub to prevent it from rotating. Thus, except for the additional rotation of the socket plate to a position to bear against the hub (and possibly having to turn back to front), it is non-directional and will go into play after a slight angular movement thereof, whether used on a right hand or left hand nut.

The replacement of the outside and inside rims on the hub will not be described since it can be done in the conventional manner and it is believed that the utilization of the truck wheel wrench apparatus of this invention for the replacement operation is apparent from the proceeding description.

As apparent from the foregoing description, the apparatus of this invention overcomes the objection to wrenches such as gear type wrenches which are effective only on outer nuts 17 since the gear reducer must be anchored on square nut 16. As a result gear type wrenches are no more than a plain slide bar wrench when used on inner nut 16 or a front wheel nut (heavier nut 17 described hereinafter). Further the cost and breakage of the inner sleeve and gear teeth of a gear wrench are important factors to consider.

Air or electric impact wrenches suffer from the disadvantage that they are not usable on individual trucks without a source of power, and because of their cost which is beyond that of many service stations. In their larger sizes they are too powerful for practical purposes.

Advantages of applicant's invention are that by supplying a basic kit, the collars may be formed and welded to one's present wrench and also the box end wrench formed by providing a handle 36 and welding it to the socket 37. Further, the apparatus of this invention is of a size so that it can be readily stored in a truck in the space occupied by the original wrench. Additional breakage (which is unlikely) can be restored by welding.

It is to be mentioned that with applicant's apparatus the effective leverage is increased such a great deal over a single slide bar style that the nuts which will not yield to a diligent effort with applicant's apparatus should be peened or other means should be used to ease the bind rather than resorting to more force as there is a limit to the strength of stud 15. If too great a force is applied through the stuck nuts to stud 15, the stud may be broken or stripped and it is a rather high priced labor operation to be replaced.

As many widely apparently different embodiments of this invention may be made without departing from the spirit and scope thereof, it is to be understood that I do not limit myself to the specific embodiments herein.

What I claim is:

1. Truck wheel wrench apparatus for removing a Budd wheel having an inside rim and an outside rim mounted on a hub by studs, square nuts and hexagonal nuts respectively, the square nuts being threaded on the studs and the hexagonal nuts being threaded on the square nuts, comprising the combination of a wrench assembly having a shank, a square nut socket on one end of the shank, a hexagonal socket on the opposite end of the shank, and a polygonal collar mounted on the shank intermediate said square and hexagonal sockets to transmit a turning force to said shank, said hexagonal socket having a transverse slide bar aperture therein, an elongated slide bar positionable in said aperture for applying a turning force to said assembly when the square socket is positioned on a square nut, and a second elongated wrench having a handle and a socket secured to said handle and positionably over said collar and forming a matching fit therewith, said second wrench socket being positionable on said collar to have the handle extend at approximately right angles to the slide bar in a plane parallel to the plane of elongation of the slide bar.

2. In a kit for adapting a wrench having a shank and a socket at each end of the shank and an elongated rod to provide a wrench assembly for removing a polygonal nut from a stud that in part retains a wheel on a hub, a pair of metal segments preformed to form an open sided pentagon for being welded to said wrench, said open sides being of a size to permit the metal segments to slip over the shank of said wrench, a box end socket having outwardly extending legs for being welded to said rod and a socket plate having an aperture therein for being fitted over said nut and of a length to bear against said hub.

3. Truck wheel wrench apparatus for removing a Budd wheel having a hub with a reduced diametric outer end portion, an inside rim and outside rim mounted on said hub by studs, square nuts and hexagonal nuts respectively, the square nuts being threaded on the studs and the hexagonal nuts being threaded on the square nuts, comprising the combination of a wrench assembly having a shank, a square nut socket on one end of the shank, a hexagonal socket on the opposite end of the shank, and a polygonal collar mounted on the shank intermediate said square and hexagonal sockets, said hexagonal socket having a transverse slide bar aperture therein, an elongated slide bar positionable in said aperture for applying a turning force to said assembly when the square socket is positioned on a square nut, a second elongated wrench having a handle and a socket secured to said handle and positionably over said collar and forming a matching fit therewith, said second wrench socket being positionable on said collar to have the handle extend at approximately right angles to the slide bar in a plane parallel to the plane of elongation of the slide bar and an elongated wrench plate having a central hexagonal aperture therein of a size to form a close fit with the hexagonal nut, said plate being of an elongated length to bear against said reduced diametric end portion when said plate is positioned on said hexagonal nut.

References Cited in the file of this patent

UNITED STATES PATENTS

| | | |
|---|---|---|
| 863,551 | Mulrony | Aug. 13, 1907 |
| 929,241 | Parker | July 27, 1909 |
| 1,458,956 | Sayer | June 19, 1923 |
| 1,495,468 | Woerpel | May 27, 1924 |
| 1,724,491 | Mandl | Aug. 13, 1929 |
| 1,764,379 | Zilliox | June 17, 1930 |
| 2,267,012 | Bowne | Dec. 23, 1941 |
| 2,313,398 | Ronning | Mar. 9, 1943 |
| 2,459,672 | Morsch | Jan. 18, 1949 |
| 2,486,022 | Haist et al. | Oct. 25, 1949 |
| 2,651,230 | Waterval | Sept. 8, 1953 |
| 2,911,867 | Ross | Nov. 10, 1959 |

FOREIGN PATENTS

| | | |
|---|---|---|
| 641,179 | France | Apr. 10, 1928 |
| 958,438 | France | Sept. 12, 1949 |
| 558,801 | Great Britain | Jan. 21, 1944 |